(No Model.)
D. S. WEST & D. JOHNSON.
SAW CLAMP.
No. 573,737.  Patented Dec. 22, 1896.
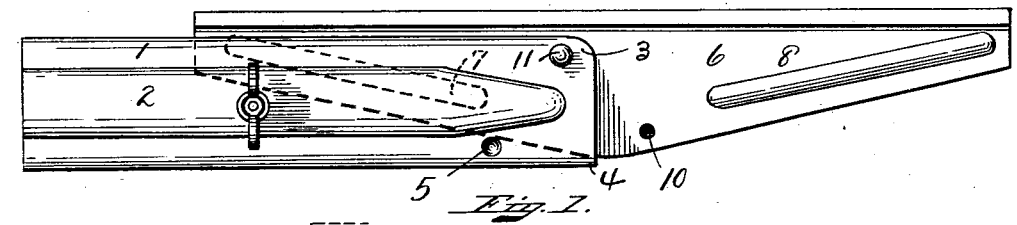
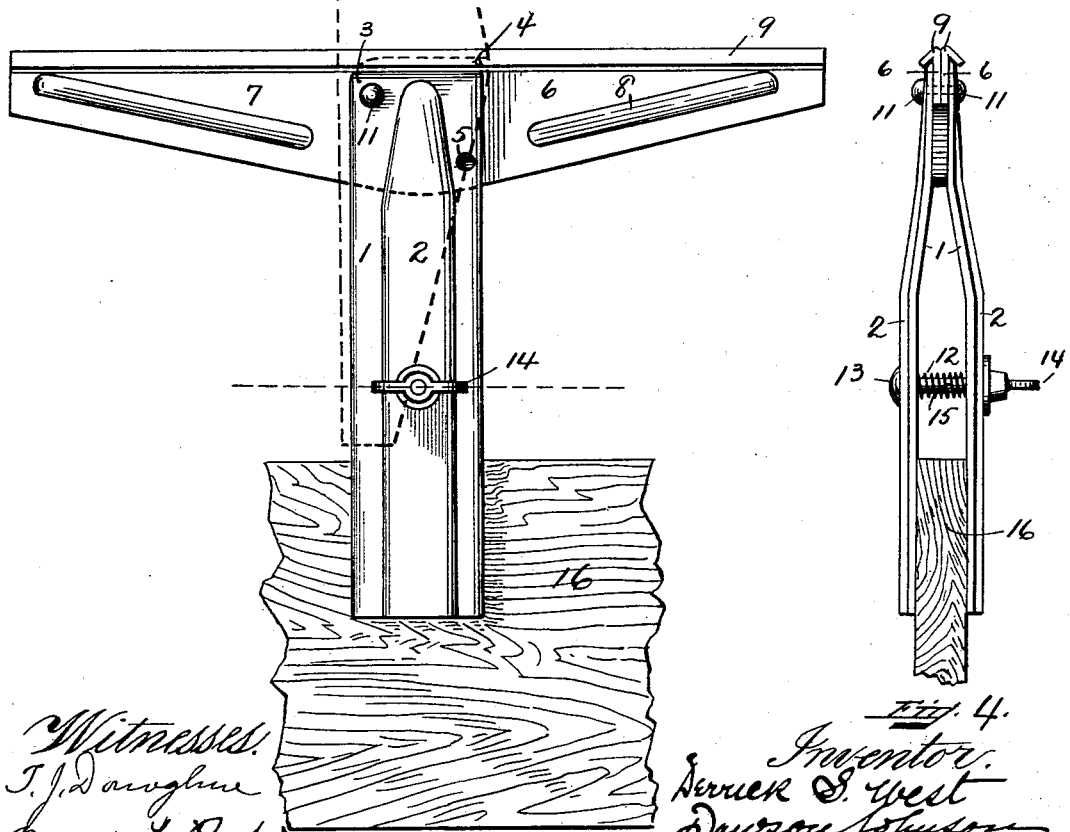
Witnesses:
T. J. Donoghue
Fray L. Perkins
Inventor.
Derrick S. West
Dawson Johnson
By their Atty
Harrison Durham

UNITED STATES PATENT OFFICE.

DERRICK S. WEST AND DAWSON JOHNSON, OF BOSTON, MASSACHUSETTS.

SAW-CLAMP.

SPECIFICATION forming part of Letters Patent No. 573,737, dated December 22, 1896.

Application filed February 21, 1896. Serial No. 580,280. (No model.)

*To all whom it may concern:*

Be it known that we, DERRICK S. WEST and DAWSON JOHNSON, of Boston, in the county of Suffolk and State of Massachusetts, have invented a new and useful Improvement in Saw-Clamps, of which the following, taken in connection with the accompanying drawings, is a specification.

Our improvement relates to clamps; and the objects of our improvement are to provide a compact clamp of durable construction and quickly adjusted, and which may be conveniently carried about and is capable of being used as a try-square, bevel-square, or compass, as may be desired, and by reason of the construction of sheet-steel with ribs or corrugations great strength is attained with extremely light weight; also, to fold the upright plates parallel to the jaws and thus occupy very little space, so as always to be handy for the workman for filing a saw or for any other purpose. We attain these objects by the means illustrated in the accompanying drawings, in which—

Figure 1 is a longitudinal view of our mechanism closed. Fig. 2 is a front view of our mechanism ready for use. Fig. 3 is a section on the dotted line in Fig. 2. Fig. 4 is a side view of our mechanism.

Similar numerals refer to similar parts throughout the views.

1 and 1 are plates made, preferably, of sheet-steel, but which may be made of other metal or suitable material, as well as the parts hereinafter described. We have shown the plate 1 provided with a longitudinal rib 2, but the rib may be dispensed with. The corner 3 of the rib 1 is made round and the corner 4 is made square.

5 is a boss punched from the outside of the plate 1.

6 and 6 are jaws provided with a rib 7 and 8, which may be dispensed with, if desired.

11 is a pivot by which the jaw 6 is pivoted to the plate 1.

12 is a bolt passing through the plates 1 and 1 and having the head 13 outside of one plate, and the thumb-nut 14 on the outside of the other plate having the thread corresponding to the thread on said bolt. 15 is a spring around said nut between the plates 1 and 1.

16 is any piece of wood on which the clamp may be adjusted, and may be any piece of a board, preferably seven-eighths of an inch thick.

By turning the jaws 6 and 6 on the pivot 11 the round corner 3 allows the lips 9 on said jaws to pass over the edge of the plate 1 and the boss 5 springs into the socket 10, and the jaws are held firmly in the position shown in Fig. 2. The inner ends of the plates 1 1 being placed over a board 16, the clamp is held firmly thereon by means of the nut 14, tightening the plates upon said wood as they are forced closer together on the bolt 12.

The saw may be adjusted between the lips 9 and 9 of the jaws 6, as may be desired. By unscrewing the thumb-nut 14 the plates 1 1 are released from the wood 16 and the jaws 6 6 may be turned on the pivot 11 to the position shown by the dotted lines in Fig. 2, and the clamp is in the position shown in Fig. 1, when it may be easily carried or put away in any tool-chest.

The plate 1 and the jaw 6 may be used as a try-square, and by turning the jaw on the pivot 11 the plate and jaw may be used as a bevel-square, while the two jaws being turned as one angle on the pivots may be used as compasses.

Having described our invention, what we claim, and desire to secure by Letters Patent, is—

1. The portable folding saw-clamp herein described, consisting of the clamping-plates 1, 1, with screw-threaded bolt, thumb-nut, and spring, in combination with the jaws 6, 6, pivoted between the clamping-plates near one corner thereof, said plates having bosses 5 to engage with sockets 10 on the said jaws, whereby the latter may be secured at right angles to the plates to serve as a clamp or try-square, or turned into parallel position for compact carriage, substantially as and for the purpose specified.

2. As an improvement in saw-clamps, the corrugated metallic clamping-plates 1, 1, provided with clamping-bolt and thumb-nut about midway between the ends thereof, in combination with pivoted lipped jaws 6, 6, and suitable stops, whereby the said jaws may be held either in a right-angled or a parallel position relatively to the clamping-plates, and by the same clamping means that clamps the plates to the support, substantially as and for the purpose specified.

3. The herein-described improvement in saw-clamps, consisting of corrugated sheet-metal clamping-plates 1, 1, with intermediate clamping means as described, in combination with the corrugated and lipped sheet-metal jaws 6, 6, pivoted at one corner of the clamping-plates, and provided with stops, whereby the said jaws may be held either at right angles or parallel to the said clamping-plates, and compressed by the same clamping means that secures the plates to the support, substantially as and for the purpose specified.

In testimony whereof we have signed our names to this specification, in the presence of two subscribing witnesses, on this 28th day of September, A. D. 1895.

DERRICK S. WEST.
DAWSON JOHNSON.

Witnesses:
H. DUNHAM,
H. E. REMICK, Jr.